Figure 1:
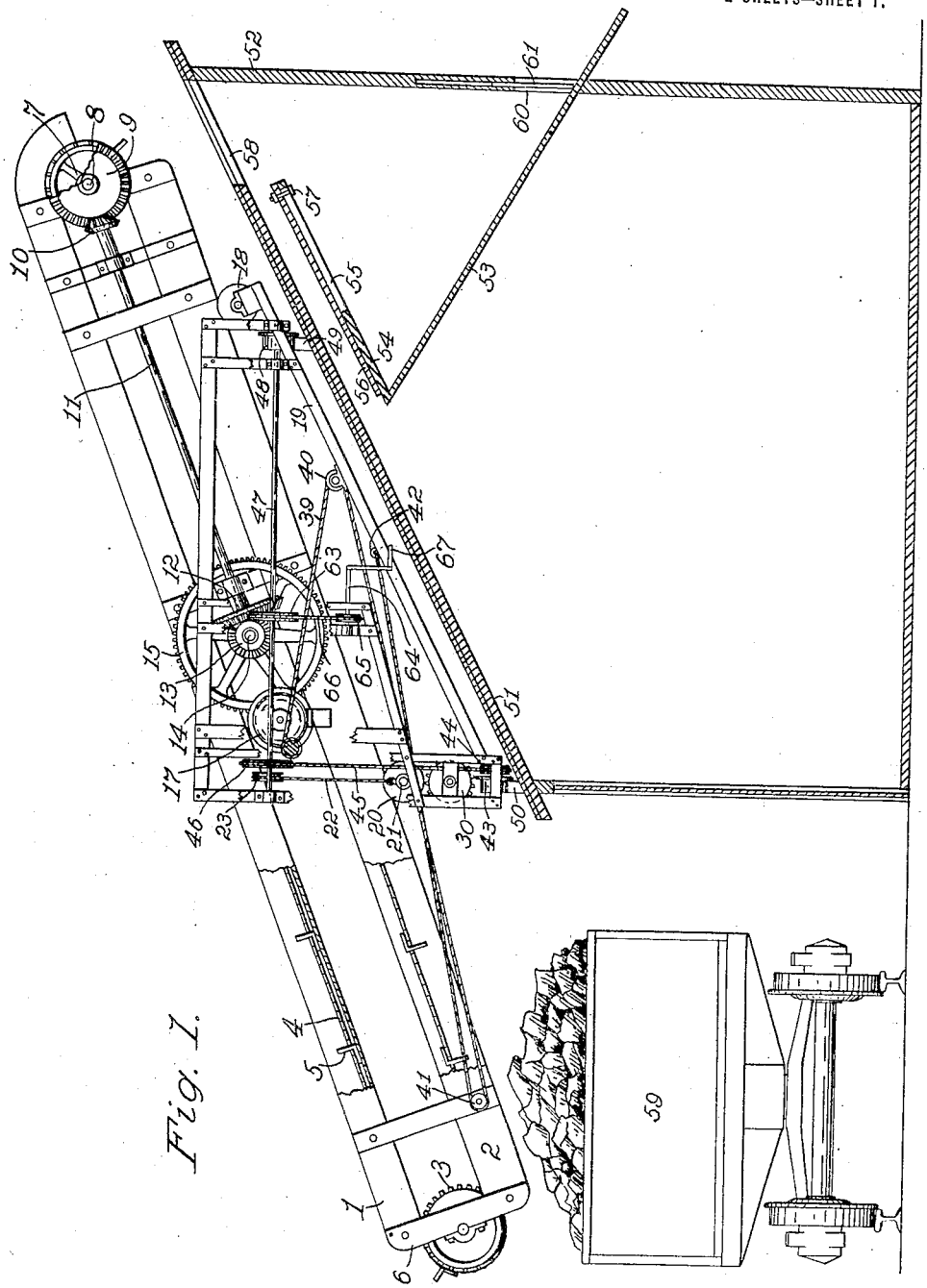

W. J. VOELKER.
CONVEYER.
APPLICATION FILED JUNE 2, 1919.

1,348,671.

Patented Aug. 3, 1920.
2 SHEETS—SHEET 1.

Inventor,
W. J. Voelker, by
G. C. Kennedy,
Attorney.

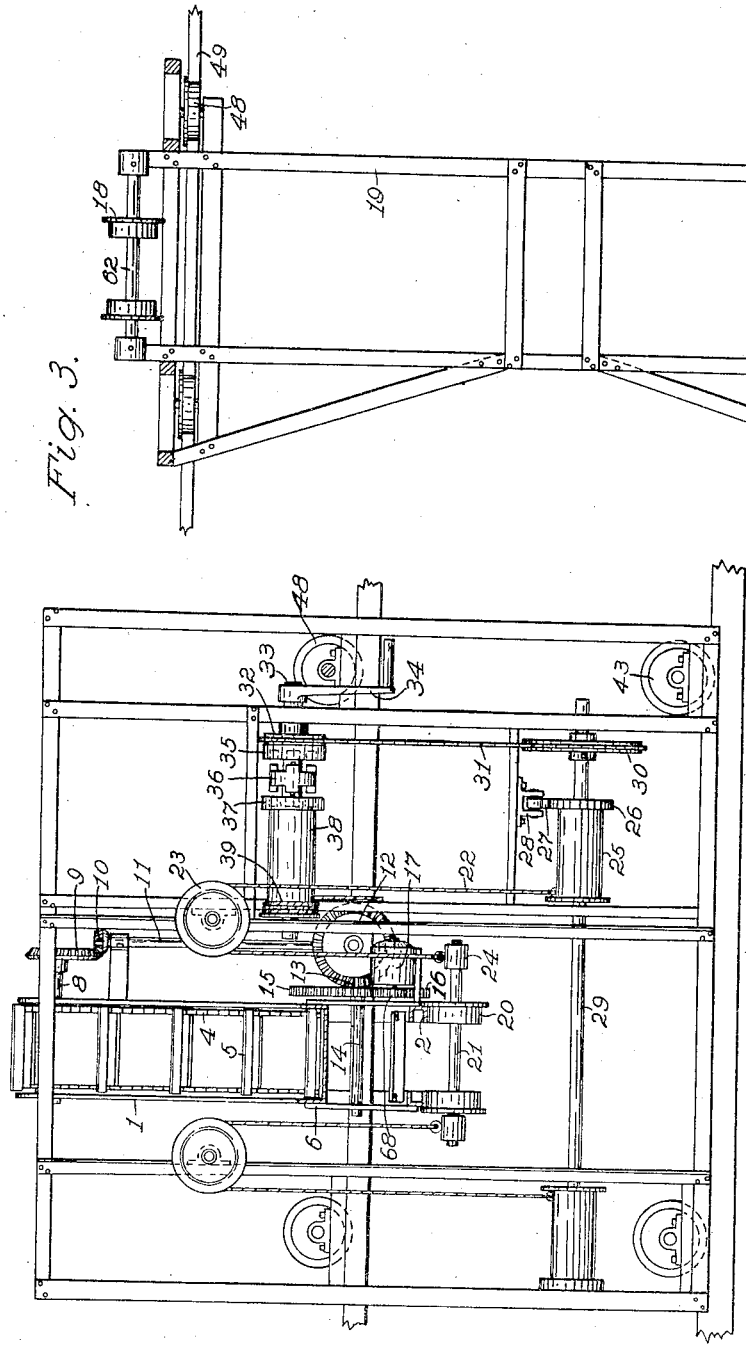

UNITED STATES PATENT OFFICE.

WILLIAM J. VOELKER, OF WATERLOO, IOWA.

CONVEYER.

1,348,671.  Specification of Letters Patent.  Patented Aug. 3, 1920.

Application filed June 2, 1919. Serial No. 301,166.

*To all whom it may concern:*

Be it known that I, WILLIAM J. VOELKER, a citizen of the United States of America, and a resident of Waterloo, Blackhawk county, Iowa, have invented certain new and useful Improvements in Conveyers, of which the following is a specification.

My invention relates to improvements in conveyers, and the object of my improvement is to furnish apparatus for transferring coal or other materials from a car or other receptacle to a storage building or other place, the apparatus being mounted movably for different changes of location relative to either the loading place or the place for unloading.

This object I have accomplished by the means which are hereinafter described and claimed, and which are illustrated in the accompanying drawings, in which Figure 1 is a side elevation, with parts broken away, of my improved device as operatively mounted upon a storage building, the latter being shown in cross-section; Fig. 2 is a front end elevation of the supporting structures of the apparatus, with parts of the supported mechanism removed, and Fig. 3 is a plan of the basal part of said structures, with the superstructures removed.

Similar numerals of reference denote corresponding parts throughout the several views.

Referring first to said Fig. 1, I have shown my improved apparatus mounted upon the roof 51 of a storage building 52. In said roof, is a hatchway or receiving opening 58. Within the building, under said opening, is an inclined plane or chute 53 leading to a delivery opening 60 normally closed by a sliding closure 61, so that the chute may be used for temporary storage purpose, but the chute is preferably projected without the building as shown, in order to evacuate its contents to a wagon outside. The upper end of the chute does not extend to the ceiling, but is spaced therefrom, and forward of the upper end of the chute another inclined plane or chute 54 is united thereto but is oppositely inclined to deliver into the building forward of the chute 53. However, since the rear and upper end of the chute 54 is forward or at least in line with the front wall of the opening 58, a sliding section 56 is mounted on this chute to be moved back to close the entry to the chute 53, the chute 54 having a slot 55 and the section 56 a bolt 57 whereby said section may be secured in any position, and so that when extended, it may receive materials shot through said opening 58 and carry them to the upper surface of the chute 54, whence they are delivered into the lower part of said building.

The numerals 49 and 50 denote parallel spaced rails fixed longitudinally upon the roof 51 of said building, both forward of the opening 58.

My improved conveying mechanism is mounted upon a supporting structure or framework 19, which may be considerably varied in its components, hence is not specifically described in all its parts or members. As shown in said Fig. 3, its lower portion is substantially an elongated parallelogram, suitably braced, and having erected upon its corners one or more fixed standards or posts, which latter are cross-connected at different locations to properly support bearings for the moving parts of the contained and supported mechanisms.

In said lower part of the framework 19 are mounted the flanged traveler-wheels 48 and 43 to roll upon the rails 49 and 50 respectively in transporting the apparatus longitudinally upon said building. For the purpose of shifting said apparatus longitudinally upon the building, I employ the following manually actuated mechanism:

A rotatable shaft 47 is mounted across the upper part of the framework 19, with one of the rear traveler wheels 48 fixed upon its rear end. A small sprocket-wheel 44 is fixed upon the shaft or pintle of the opposite forward traveler-wheel 43. A larger sprocket-wheel 46 is fixed on the forward part of said shaft 47 above the sprocket-wheel 44, and is connected to the latter by means of a sprocket-chain 45. Another sprocket-wheel 63 is secured on the shaft 47 above a small sprocket-wheel 65 on a short shaft 64, and connected to the wheel 65 by a sprocket-chain 66. A crank-handle 67 is mounted on the shaft 64 for manual rotation of the latter.

The conveyer of my apparatus is of a well-known type, comprising an open-top chute 1 or flanged slideway for the material to be carried thereover from a car 59 to said roof opening 58, and side-plates 2 connected thereto by a plurality of cross-bars 6. Rotatable shafts 8 are mounted across both the front and rear ends of the conveyer frame and carry spaced pairs of sprocket-wheels 3 and 7 respectively, which are connected by sprocket-chains 4, the latter having a plurality of cross-connections 5 consisting of angle-bars with erect flanges to push the material along and up the chute 1. The chains are moved along the chute by the following mechanism:

A motor 17 is bracketed upon the conveyer frame and has upon its power-shaft a spur-pinion 68 meshed with and rotating a gear-wheel 15 having an axial bevel-pinion 13. The latter meshes with and drives a bevel-gear 12 fixed on a rotatable shaft 11 whose rear end carries a bevel-pinion 10 in mesh with a bevel-gear 9 on the rear shaft 8.

I have provided means for raising or lowering the forward or receiving end of said conveyer. As shown in said Fig. 2, the lower parts 2 of the conveyer frame may be channel-bars which have their forward parts riding upon a pair of flanged idler-wheels 20 mounted on a shaft 21 which is rotatable in bearing-boxes 24 suspended on a pair of cables 22, the latter passed upwardly about idler-sheaves 23, thence downwardly to be secured to and wound upon like winding-drums 25. One of the latter has a ratchet-wheel 26 rigid therewith whose teeth are movably engaged by a pawl 27 mounted in a bracketed support 28. The drums 25 are fixed upon a shaft 29, and upon the latter is a large sprocket-wheel 30, the latter connected to a smaller sprocket-wheel 32 loose on a rotatable shaft 33 thereabove by means of a sprocket-chain 31. A handled crank 34 is fixed on one end of the shaft for manually rotating it.

Upon said shaft 33 is fixed a winding-drum 38, and upon the latter is wound a cable 39, carried thence about a sheave 40 on the frame 19, thence forwardly about a sheave 41 on the forward part of the conveyer frame, and thence rearwardly to an anchorage or eye-bolt 42 on the frame 19.

A double-face clutch-sleeve 36 is slidingly non-rotatably splined upon the shaft 33 between the drums 38, and the sprocket-wheel 32, said drum and sprocket-wheel respectively, having mating clutch-heads 37 and 35 for alternate releasable engagement with said double-clutch 36.

When the clutch 36 is engaged with the clutch-head 35 of the sprocket-wheel 32, and the shaft 33 appropriately rotated, the drums 25 are employed in winding up the cables 22, thus lifting the forward end of the conveyer to a desired altitude relative to the loading location. The conveyer may be lowered by releasing the pawl 27.

When the clutch-sleeve 36 is engaged with the clutch-head 37 of the drum 38, and the shaft 33 rotated, the cable 39 is wound up to shift the conveyer rearwardly upon the carrier-wheels 20 and 18. The device is therefore operable within its scope of movements for convenient change of position to suit different conditions and locations for loading and unloading.

Having described my invention, what I claim as new, and desire to secure by Letters Patent, is:

1. In combination, a traveling conveyer supported for both longitudinal and lateral displacements, mechanism for shifting the conveyer laterally, and other mechanism containing disconnectibly connected elements adapted for alternate coactions to either shift the conveyer longitudinally or to raise and lower its receiving part vertically.

2. In combination, a framework mounted upon a building movably for longitudinal transportation therealong, carrier wheels rotatably mounted upon the rear part of said framework, other carrier wheels supported upon the forward part of said framework for vertical changes of position relative thereto, a traveling conveyer mounted at the rear upon the rear carrier wheels for longitudinal and pivotal movements relative thereto, and also supported movably upon the forward carrier wheels.

3. In combination, a framework mounted upon a building movably for longitudinal transportation therealong, carrier wheels rotatably mounted upon the rear part of said framework, other carrier wheels suspended upon the forward part of said framework, for vertical displacements relative thereto, and a traveling conveyer supported movably upon both sets of carrier wheels for both longitudinal movements thereover, and for vertical tilting movements of its receiving end when the forward carrier wheels are raised or lowered.

Signed at Waterloo, Iowa, this 17th day of May, 1919.

WILLIAM J. VOELKER.